United States Patent
Fujino et al.

(10) Patent No.: US 8,797,624 B2
(45) Date of Patent: Aug. 5, 2014

(54) SCANNING OPTICAL APPARATUS AND IMAGE FORMING APPARATUS

(71) Applicant: Brother Kogyo Kabushiki Kaisha, Nagoya (JP)

(72) Inventors: Hitoshi Fujino, Tajimi (JP); Hiroyuki Ominato, Nagoya (JP); Yoshifumi Nakamura, Inazawa (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/014,674

(22) Filed: Aug. 30, 2013

(65) Prior Publication Data
US 2014/0071509 A1 Mar. 13, 2014

(30) Foreign Application Priority Data
Sep. 10, 2012 (JP) ................. 2012-198121

(51) Int. Cl.
G02B 26/08 (2006.01)

(52) U.S. Cl.
USPC ............ 359/207.4; 359/207.3; 359/216.1

(58) Field of Classification Search
USPC ............... 359/207.2–207.4, 216.1–219.2; 347/258–261, 250
See application file for complete search history.

(56) References Cited

U.S. PATENT DOCUMENTS

| 6,104,522 | A | 8/2000 | Hayashi et al. |
| 8,077,370 | B1 | 12/2011 | Ominato et al. |
| 2008/0158331 | A1* | 7/2008 | Kato ............................ 347/259 |

FOREIGN PATENT DOCUMENTS

| JP | 3072061 B2 | 7/2000 |
| JP | 2012-008373 A | 1/2012 |

* cited by examiner

Primary Examiner — James Phan
(74) Attorney, Agent, or Firm — Merchant & Gould P.C.

(57) ABSTRACT

In a scanning optical apparatus including a single lens configured to convert a beam deflected by a polygon mirror into a spot-like image on a to-be-scanned surface, the lens satisfies the conditions: $-0.59 < \beta1 \leq 0$, $-0.46 < \beta2 \leq 0.2$, $-0.6 \leq D1 < 0.43$, and $-0.17 \leq D2 \leq 0.16$ where $\beta1$ indicates an angle [deg] formed in a main scanning plane between a first optical axis and a reference line perpendicular to the to-be-scanned surface, $\beta2$ indicates an angle [deg] formed in the main scanning plane between the first optical axis and a second optical axis, D1 indicates an amount of shift [mm] in the main scanning plane, of a point of intersection between the first optical axis and an incident-side lens surface, from the reference line, and D2 indicates an amount of shift [mm] in the main scanning plane, of a point of intersection between the second optical axis and an exit-side lens surface, from the first optical axis.

5 Claims, 8 Drawing Sheets

FIG. 5

EXAMPLE 1

| | | |
|---|---|---|
| WAVELENGTH | $\lambda$ [nm] | 788 |
| REFRACTIVE INDEX OF f$\theta$ LENS | n | 1.503 |
| ANGLE OF INCIDENCE ON POLYGON MIRROR | $\alpha$ [deg] | 90 |
| DISTANCE FROM POLYGON MIRROR TO f$\theta$ LENS | e[mm] | 32.7 |
| THICKNESS AT CENTER OF f$\theta$ LENS | d[mm] | 13.5 |
| DISTANCE FROM f$\theta$ LENS TO TARGET SURFACE | fb[mm] | 98.0 |
| f$\theta$ COEFFICIENT | k[mm] | 126 |
| MAXIMUM SCAN RANGE | [mm] | ±105 |
| MAXIMUM SCAN ANGLE OF POLYGON MIRROR | $\theta$ eos[deg] | 47.75 |
| DISTANCE FROM POLYGON MIRROR TO NATURAL CONVERGENT POINT | fc[mm] | 256.6 |
| ANGLE FORMED BETWEEN SYNCHRONIZATION DETECTION BEAM PATH AND REFERENCE LINE | $\theta$ bd[deg] | -60.96 |

| CONSTANTS OF LENS | | |
|---|---|---|
| | FIRST SURFACE (INCIDENT SIDE) | SECOND SURFACE (EXIT SIDE) |
| Cy | 1.49E-02 | 6.26E-03 |
| cc | -1.68E+01 | -1.03E+02 |
| $A_4$ | -2.05E-06 | -2.92E-06 |
| $A_6$ | 1.36E-09 | 1.15E-09 |
| $A_8$ | -5.37E-13 | -3.28E-13 |
| $A_{10}$ | 1.18E-16 | 5.18E-17 |
| $A_{12}$ | -1.09E-20 | -2.94E-21 |
| Cx | -7.94E-02 | -1.06E-01 |
| $B_2$ | 1.34E-03 | 5.05E-04 |
| $B_4$ | 1.22E-07 | -4.30E-07 |
| $B_6$ | -1.09E-09 | 2.28E-10 |
| $B_8$ | 7.75E-13 | -1.22E-13 |
| $B_{10}$ | -2.15E-16 | 4.22E-17 |
| $B_{12}$ | 2.34E-20 | -5.42E-21 |
| LENS SHIFT AMOUNT | D1 [mm] | -0.265 |
| LENS TILT AMOUNT | $\beta$1 [deg] | -0.185 |
| LENS SURFACE SHIFT AMOUNT | D2 [mm] | 0.042 |
| LENS SURFACE TILT AMOUNT | $\beta$2 [deg] | -0.245 |

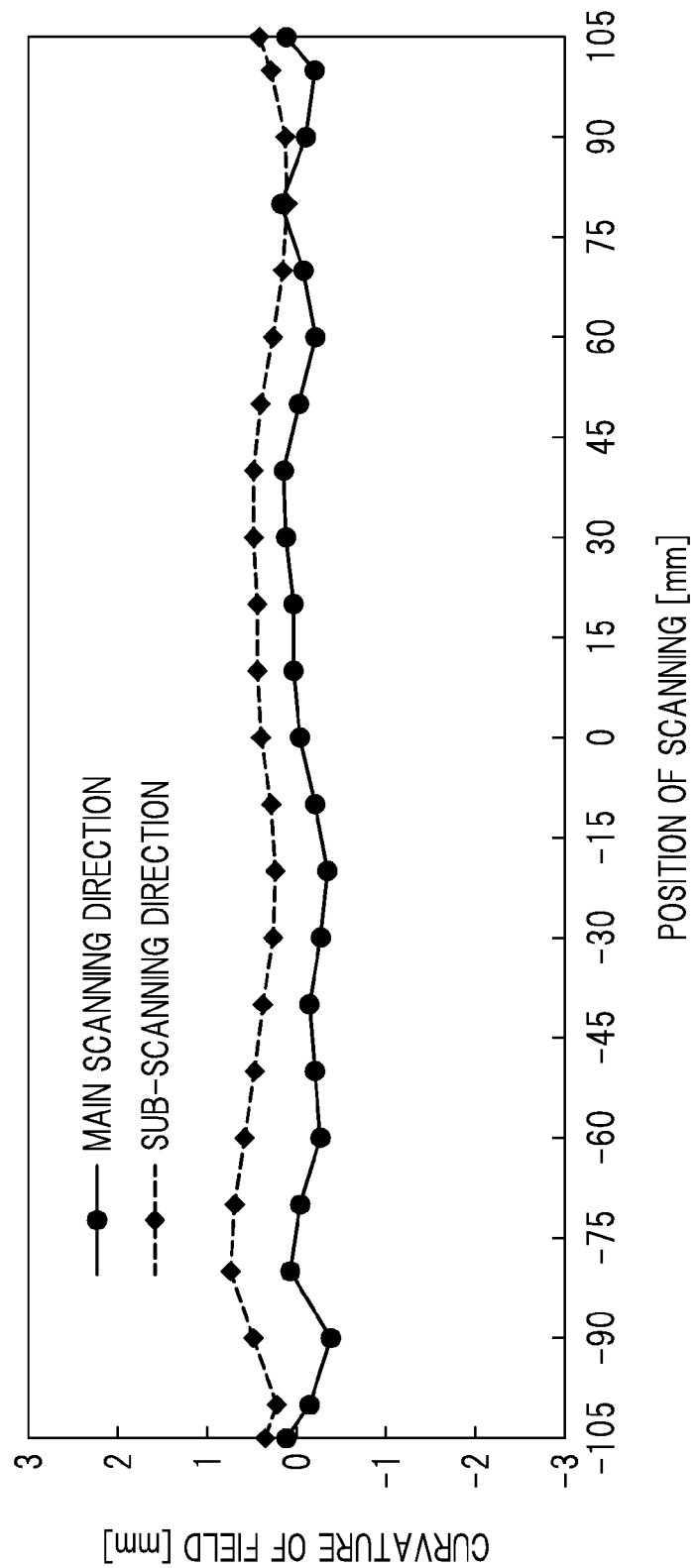

FIG. 8

| | D1 [mm] | β1 [deg] | D2 [mm] | β2 [deg] | CURVATURE OF FIELD IN MAIN SCANNING DIRECTION PV [mm] | CURVATURE OF FIELD IN SUB-SCANNING DIRECTION PV [mm] | fθ CHARACTERISTIC PV [%] | LINEARITY PV [%] | EVALUATION |
|---|---|---|---|---|---|---|---|---|---|
| EXAMPLE 1 | −0.265 | −0.185 | 0.042 | −0.245 | 0.56 | 0.61 | 0.110 | 0.353 | OK |
| EXAMPLE 2 | 0.000 | −0.303 | −0.019 | −0.090 | 1.07 | 1.04 | 0.098 | 0.273 | OK |
| EXAMPLE 3 | −0.490 | 0.000 | 0.140 | −0.384 | 1.36 | 0.69 | 0.096 | 0.424 | OK |
| EXAMPLE 4 | −0.182 | −0.250 | 0.000 | −0.193 | 0.57 | 0.71 | 0.128 | 0.449 | OK |
| EXAMPLE 5 | −0.017 | −0.291 | −0.018 | −0.081 | 1.02 | 1.25 | 0.092 | 0.266 | OK |
| EXAMPLE 6 | 0.000 | −0.279 | 0.000 | −0.091 | 1.13 | 1.07 | 0.082 | 0.251 | OK |
| EXAMPLE 7 | 0.000 | 0.000 | 0.144 | −0.087 | 2.74 | 1.52 | 0.065 | 0.267 | OK |
| EXAMPLE 8 | −0.520 | 0.000 | 0.160 | −0.401 | 1.35 | 0.67 | 0.074 | 0.471 | OK |
| EXAMPLE 9 | −0.600 | 0.000 | 0.149 | −0.453 | 1.55 | 0.52 | 0.100 | 0.526 | OK |
| EXAMPLE 10 | 0.429 | −0.588 | −0.170 | 0.200 | 2.74 | 1.78 | 0.066 | 0.192 | OK |
| MAXIMUM | 0.429 | 0.000 | 0.160 | 0.200 | | | | | |
| MINIMUM | −0.600 | −0.588 | −0.170 | −0.453 | | | | | |
| COMPARATIVE EXAMPLE 1 | −0.700 | 0.000 | 0.100 | −0.515 | 3.74 | 0.49 | 0.160 | 0.27 | NG |
| COMPARATIVE EXAMPLE 2 | 0.560 | −0.645 | −0.201 | 0.300 | 3.24 | 1.53 | 0.060 | 0.21 | NG |

SCANNING OPTICAL APPARATUS AND IMAGE FORMING APPARATUS

CROSS-REFERENCE TO RELATED APPLICATION(S)

This application claims priority from Japanese Patent Application No. 2012-198121 filed on Sep. 10, 2012, the disclosure of which is incorporated herein by reference in its entirety.

TECHNICAL FIELD

The present invention relates to a scanning optical apparatus suitable for use in an electrophotographic image forming apparatus or the like, and an image forming apparatus comprising the scanning optical apparatus.

BACKGROUND ART

In a scanning optical apparatus for scanning a target surface with a beam of light emitted from a light source using a polygon mirror deflecting the beam of light, the position in which the beam of light strikes each reflecting surface (each of specular surfaces of the polygon mirror) would vary according to a deflection direction in which the beam of light reflected therefrom travels. This phenomenon is called "sag". The sag would be a cause of curvature of field or other kind of degradation of images on the target surface to be scanned.

To reduce such adverse effects of the sag, the position in which the beam of light from the light source strikes each reflecting surface (i.e., the distance between the center of rotation of the polygon mirror and the optical axis of an optical system in which the beam of light from the light source comes to the polygon mirror) may be adjusted within a predetermined range of values such that the sag is rendered nearly symmetric with respect to the reference deflected chief ray.

SUMMARY

Thorough study conducted by the inventors has revealed that even if a sag is not rendered nearly symmetric with respect to the reference deflected chief ray but shifted to one side, the optical properties such as curvature of field can be improved satisfactorily.

It is one aspect of the present invention to provide a scanning optical apparatus which can reduce curvature of field and form a desired image on a target surface to be scanned.

More specifically, according to one embodiment, a scanning optical apparatus is provided which comprises a light source, a first optical element, a second optical element, a polygon mirror, a third optical system, and a synchronization detection beam path. The first optical element is configured to convert light emitted from the light source into a beam of light. The second optical element is configured to convert the beam of light having passed through the first optical element into a linear image extending in a main scanning direction. The polygon mirror is configured to deflect the beam of light having passed through the second optical element in the main scanning direction. The third optical element is configured to convert the beam of light having been deflected by the polygon mirror into a spot-like image to be focused on a to-be-scanned surface. The third optical element is a single lens having a pair of opposite incident-side and exit-side lens surfaces having first and second optical axes, respectively. Each of the pair of opposite lens surfaces is aspheric in a main scanning direction, and has a curvature in a sub-scanning direction varying continuously and symmetrically from a position corresponding to the optical axis thereof outward in a main scanning direction. Each of the pair of lens surfaces has a shape symmetric in the main scanning direction with respect to a sub-scanning plane containing the optical axis thereof. The synchronization detection beam path is configured such that a beam of light having passed therethrough is directed to a sensing element producing a signal for synchronization at a start-of-scan position. The synchronization detection beam path is located on one of two sides out of a range of the deflected beam of light passing through the third optical element. That one of two sides on which the synchronization detection beam path is located is the same side on which the light source is located. A distance h between a center of rotation of the polygon mirror and a center of the beam of light incident on the polygon mirror fulfills the following conditions (1):

$$R(\sin((\alpha+\theta_{eos})/2)-\cos((\alpha+\theta_{eos})/2)\times\tan(\pi/N))+(b_{eos}/2)\times\cos((\alpha+\theta_{eos})/2) < h, \text{ and}$$

$$h < R(\sin((\alpha+\theta_{bd})/2)+\cos((\alpha+\theta_{bd})/2)\times\tan(\pi/N))-(b_{bd}/2)\times\cos(\alpha+\theta_{bd})/2) \quad (1)$$

where R indicates a radius of an inscribed circle of the polygon mirror, N indicates the number of specular surfaces of the polygon mirror, $\alpha$ indicates an angle [rad] formed by the beam of light incident on the polygon mirror with a reference line extending in a direction of travel of the beam of light to be incident on the to-be-scanned surface at right angles after being reflected off the polygon mirror, $\theta_{bd}$ indicates an angle [rad] formed by the beam of light traveling from the polygon mirror along the synchronization detection beam path with the reference line, $\theta_{eos}$ indicates an angle [rad] formed by the beam of light reflected off the polygon mirror at an end-of-scan position with the reference line, and $b_{eos}$ and $b_{bd}$ indicate breadths of the beam of light in the main scanning direction on each of the specular surfaces of the polygon mirror at the end-of-scan position and at a position in which the beam of light reflected off the polygon mirror travels along the synchronization detection beam path, respectively. In addition, the third optical element fulfils all of the following conditions (2), (3), (4) and (5):

$$-0.59 < \beta 1 \leq 0 \quad (2)$$

$$-0.46 < \beta 2 \leq 0.2 \quad (3)$$

$$-0.6 \leq D1 < 0.43 \quad (4)$$

$$-0.17 \leq D2 \leq 0.16 \quad (5)$$

where $\beta 1$ indicates an angle [deg] formed in a main scanning plane between the first optical axis and the reference line, $\beta 2$ indicates an angle [deg] formed in the main scanning plane between the first optical axis and the second optical axis, D1 indicates an amount of shift [mm] in the main scanning plane, of a point of intersection between the first optical axis and the incident-side lens surface, from the reference line, and D2 indicates an amount of shift [mm] in the main scanning plane, of a point of intersection between the second optical axis and the exit-side lens surface, from the first optical axis.

In another aspect of the present invention, an image forming apparatus comprising the scanning optical apparatus as described above is proposed.

BRIEF DESCRIPTION OF THE DRAWINGS

The above aspect, its advantages and further features of the present invention will become more apparent by describing in detail illustrative, non-limiting embodiments thereof with reference to the accompanying drawings, in which:

FIG. 5 is a table showing characteristics (including constants of the lens) of an optical system embodied in accordance with Example 1;

FIG. 6 is a graph showing curvatures of field in the main scanning direction and in the sub-scanning direction, obtained from Example 1;

FIG. 8 is a table showing D1, D2, β1, β2 of Examples 1-10 and Comparative Examples 1-2, and optical performances obtained therefrom.

DESCRIPTION OF EMBODIMENTS

A detailed description will be given of an illustrative, non-limiting embodiment of the present invention with reference made to the drawings where appropriate. In the following description, a general setup of a laser printer 100 as an example of an image forming apparatus according to one embodiment of the present invention will be described briefly with reference to FIG. 1 at the outset, and then a specific configuration of a scanning optical apparatus will be described in detail.

<General Setup of Laser Printer>

Figure 1:
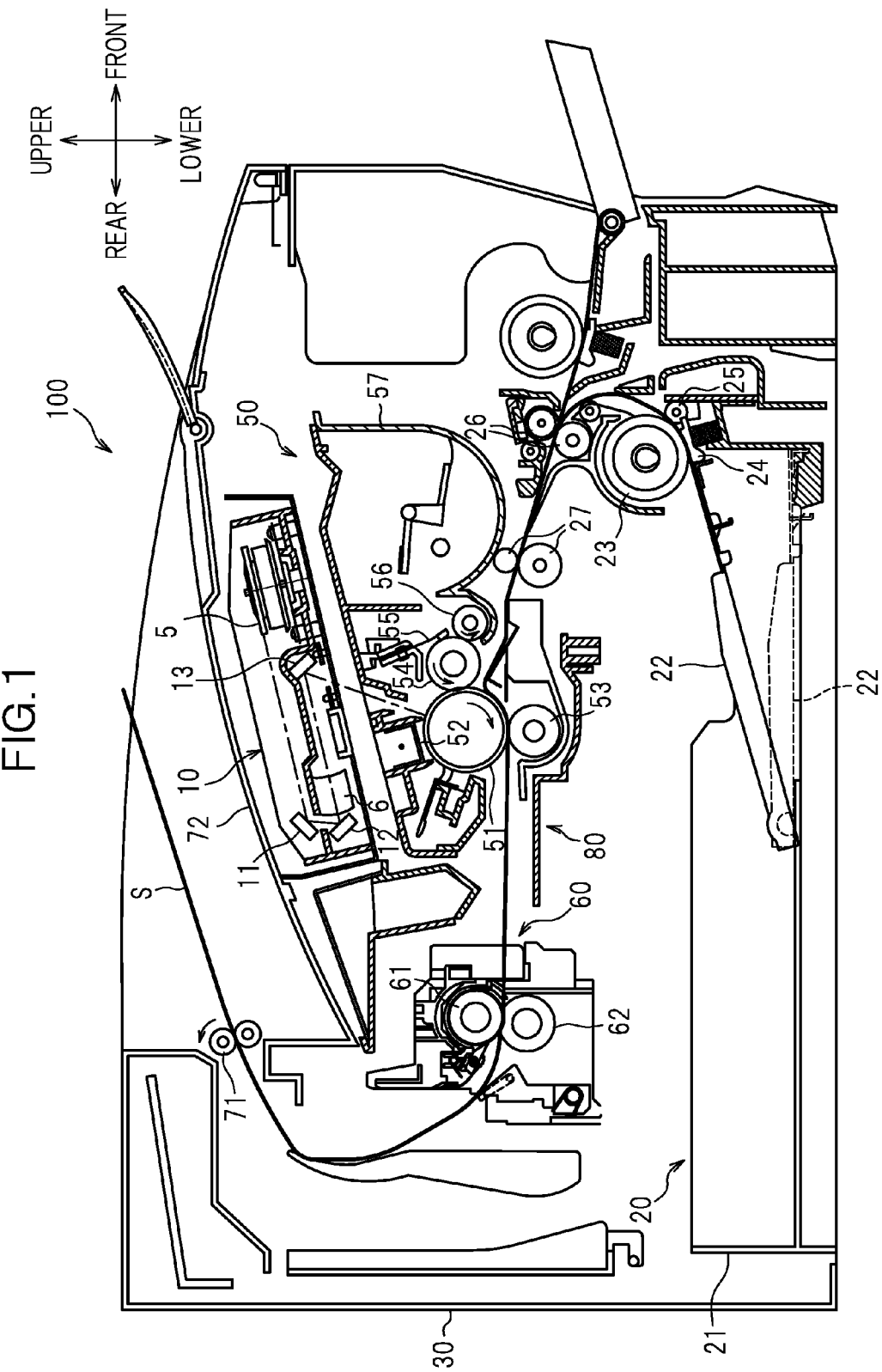
FIG. 1 is a sectional view of an image forming apparatus according to one exemplary embodiment.

As shown in FIG. 1, the laser printer 100 comprises a body casing 30, and several components housed within the body casing 30, which principally includes a feeder unit 20, for feeding a sheet S (e.g., of paper), and an image forming unit 80 for forming an image on the sheet S fed by the feeder unit 20. The image forming unit 80 includes a scanning optical apparatus 10, a process cartridge 50, a fixing unit 60, and other units. The process cartridge 50 includes a development section and a transfer section. Hereinbelow, in the following description, the direction is designated such that in FIG. 1, the right-hand side of the drawing sheet corresponds to the "front" side of the printer, the left-hand side of the drawing sheet corresponds to the "rear" side of the printer, the front side of the drawing sheet corresponds to the "left" side of the printer, and the back side of the drawing sheet corresponds to the "right" side of the printer. Similarly, the direction of a line extending from top to bottom of the drawing sheet corresponds to the "vertical" or "up/down (upper/lower or top/bottom)" direction of the printer.

The feeder unit 20 includes a sheet feed tray 21 removably installed in a bottom space within the body casing 30, and a sheet pressure plate 22 provided in a front space inside the sheet feed tray 21. The feeder unit 20 also includes a sheet feed roller 23 and a sheet feed pad 24 which are provided above a front end portion of the sheet feed tray 21, and paper powder remover rollers 25, 26 which are provided in a position downstream relative to the sheet feed roller 23 in a direction of conveyance of the sheet S (along a sheet conveyance path). The feeder unit 20 further includes a registration roller 27 provided in a position downstream relative to the paper powder remover rollers 25, 26 in the direction of conveyance of the sheet S (along the sheet conveyance path).

In the feeder unit 20, sheets S in the sheet feed tray 21 are pressed against the sheet feed roller 23 by the sheet pressure plate 22. Each sheet S pinched between the sheet feed roller 23 and the sheet feed pad 24 is conveyed by rotation of the sheet feed roller 23 through the paper powder remover rollers 25, 26 and the registration roller 27 into the image forming unit 80.

The scanning optical apparatus 10 is provided in an upper space within the body casing 30, and includes a laser beam emitter (not shown in FIG. 1), a polygon mirror 5, f-theta lens (fθ lens) 6, reflecting mirrors 11, 12, 13. The scanning optical apparatus 10 is configured to cause a laser beam to travel along a path indicated by alternate long and short dashed lines, so that a surface (peripheral surface) of a photoconductor drum 51 provided within the process cartridge 50 is rapidly scanned and illuminated consecutively with the laser beam.

The process cartridge 50 is provided below the scanning optical apparatus 10 within the body casing 30, and configured to be installable in and removable from the body casing 30. The process cartridge 50 includes a photoconductor drum 51, a scorotron charger 52, a transfer roller 53, a development roller 54, a doctor blade 55, a supply roller 56 and a toner hopper 57.

In the process cartridge 50, the peripheral surface of the photoconductor drum 51 is uniformly charged by the scorotron charger 52, and then exposed to a laser beam directed from the scanning optical unit 10, so that an electrostatic latent image is formed on the peripheral surface of the photoconductor drum 51. Toner as developer is stored in the toner hopper 57 and is supplied from the toner hopper 57 to this electrostatic latent image via the supply roller 56 and the development roller 54, so that a toner image (developer image) is formed on the peripheral surface of the photoconductor drum 51. Thereafter, while a sheet S is conveyed through between the photoconductor drum 51 and the transfer roller 53, the toner image carried on the peripheral surface of the photoconductor drum 51 is transferred onto the sheet S by the transfer roller 53 (i.e., by a transfer bias applied to the transfer roller 53). In this way, an image is formed on the sheet S.

The fixing device 60 includes a heating roller 61 for thermally fixing a toner image transferred onto a sheet S, and a pressure roller 62 configured to be pressed against the heating roller 61 with a sheet S pinched between the heating roller 61 and the pressure roller 62. This fixing device 60 is disposed in a position downstream relative to the process cartridge 50 in the direction of conveyance of the sheet S. A sheet S with a toner image thermally fixed thereon by the fixing device 60 is ejected out of the body casing 30 and placed on the sheet output tray 72 by the a pair of ejection rollers 71 which are caused to rotate so as to forward the sheet S in the direction of conveyance of the sheet S.

<Detailed Configuration of Scanning Optical Apparatus>

Figure 2:
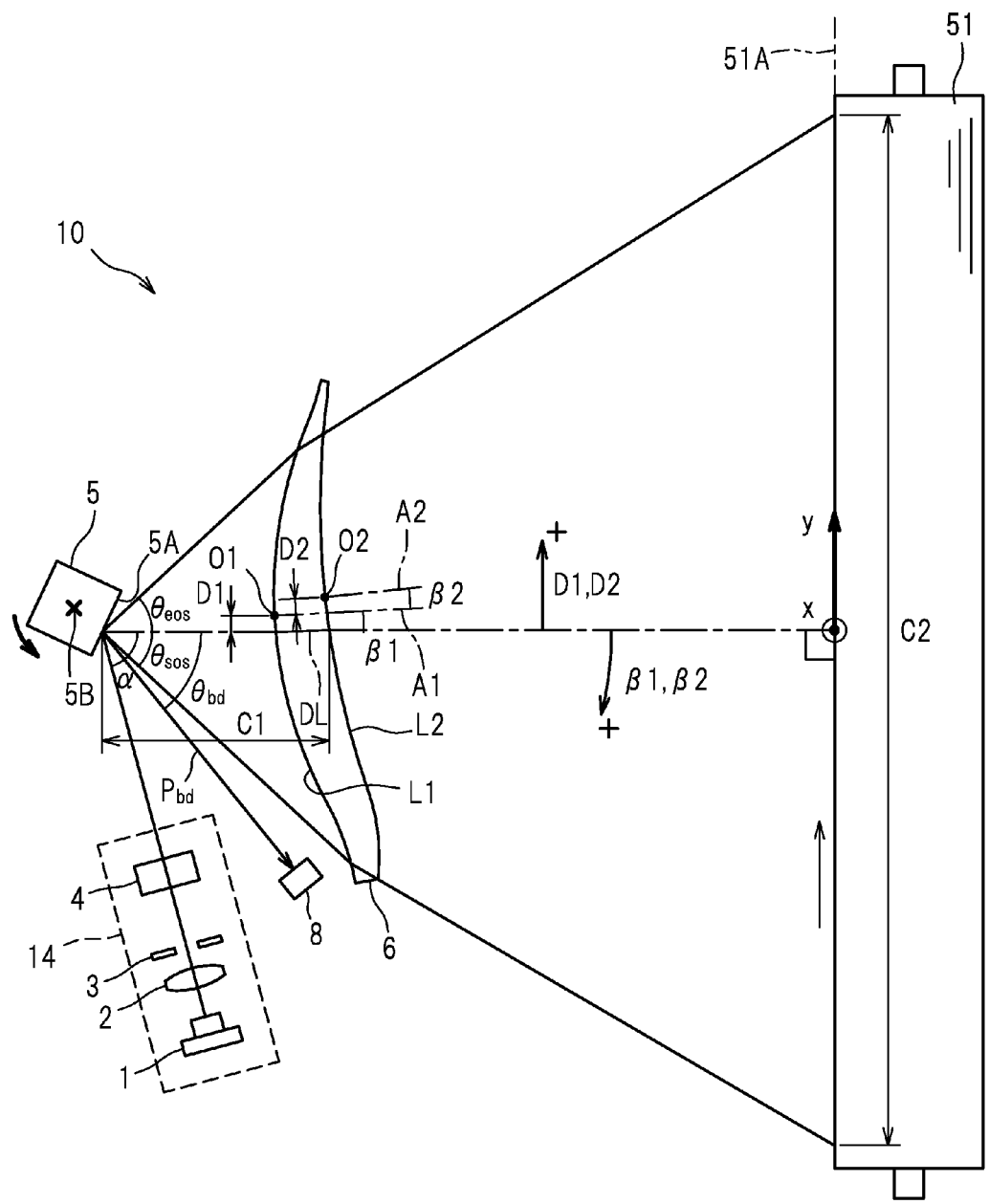
FIG. 2 is a sectional view of a scanning optical apparatus according to one exemplary embodiment taken along a main scanning plane.

As seen in FIG. 2, the scanning optical apparatus 10 includes an illumination optical system 14, a polygon mirror 5, and an f-theta lens (fθ lens) 6 as an example of a third optical element, so that a laser beam emitted from the illumination optical system 14 is converted into a spot-like image with which a target (to-be-scanned) surface 51A of the photoconductor drum 51 is scanned.

The illumination optical system 14 includes a semiconductor laser 1, a collimating lens 2 as an example of a first optical element, an aperture stop 3, and a cylindrical lens 4 as an example of a second optical element.

Figure 3:
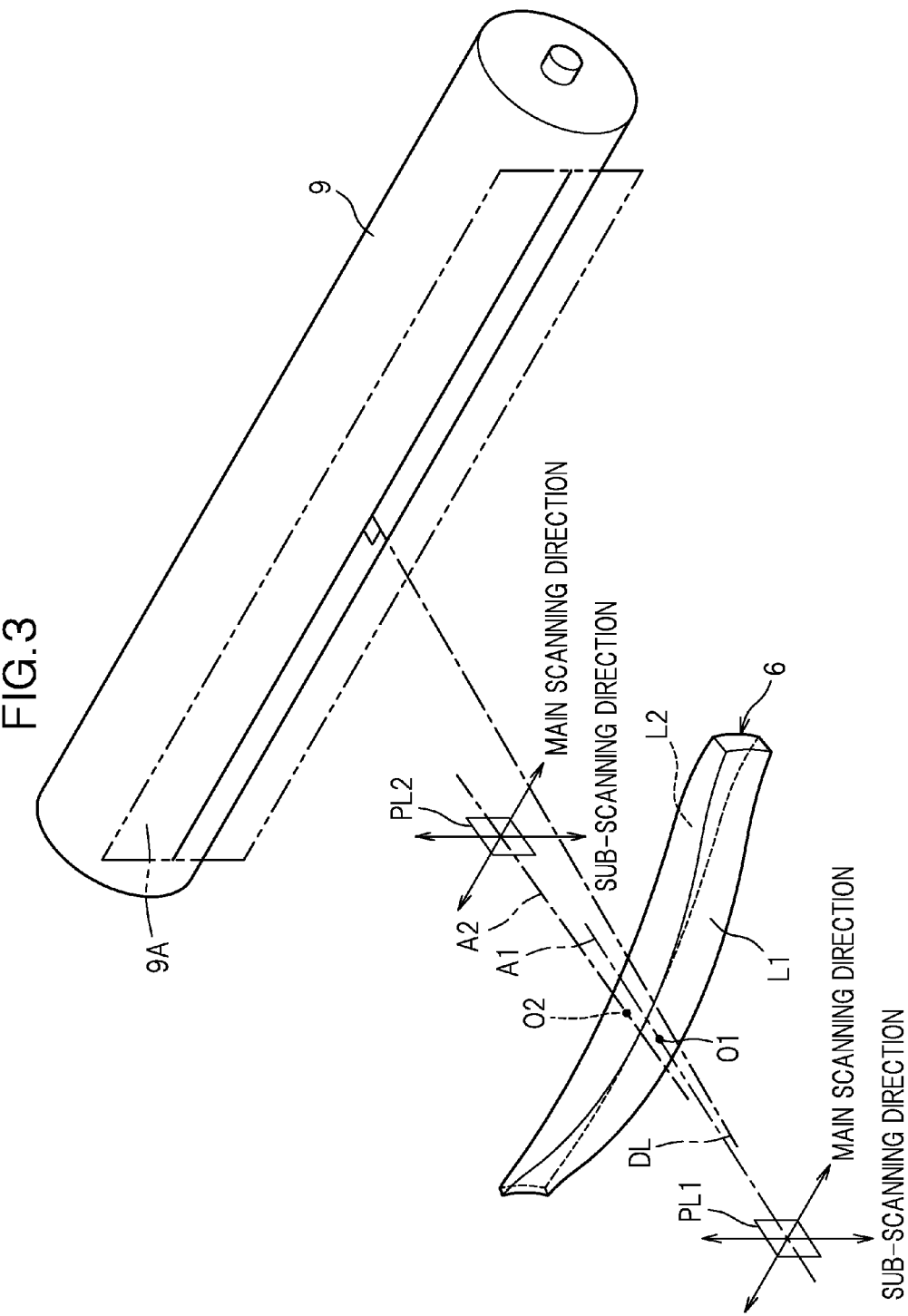
FIG. 3 is a perspective view for explaining a main scanning direction and a sub-scanning direction for each of lens surfaces of a lens.

The semiconductor laser 1 includes one or more of light sources. In one embodiment where a plurality of light sources are provided, a plurality of light-emitting elements (not shown) are arrayed substantially in a sub-scanning direction (perpendicular to a main scanning direction; i.e., a direction of an axis of rotation of the polygon mirror 5 in FIG. 2; see also FIG. 3). The light-emitting elements may be arranged in positions shifted from each other in the sub-scanning direction, and where necessary also shifted from each other in the main scanning direction.

The collimating lens 2 is a lens configured to convert laser light emitted from the semiconductor laser 1 into a beam of light that is a parallel or nearly parallel beam. It is to be understood, however, that the first optical element consistent with the present invention is not limited to such a collimating lens but may be any other kind of coupling lens configured to convert light into a predetermined beam of light which may be either of a parallel beam, a converging beam or a slightly diverging beam.

The aperture stop 3 is a member having an opening which determines a diameter of the beam of light formed by the collimating lens 2.

The cylindrical lens 4 is a lens configured to convert the beam of light having passed through the collimating lens 2 and the aperture stop 3 into a linear image extending in the main scanning direction on or near a specular surface 5A of the polygon mirror 5.

The polygon mirror 5 has a plurality of specular surfaces 5A disposed equidistantly from an axis 5B of rotation of the polygon mirror 5; the polygon mirror 5 in this embodiment as shown in FIG. 1 has four specular surfaces 5A by way of example. The polygon mirror 5 spins at a constant rotational speed about the axis of rotation 5B and reflects and deflects a beam of light having passed through the cylindrical lens 4 in the main scanning direction. The term "main scanning direction" used herein is defined as a direction of deflection of this beam of light.

The scanning apparatus 10 includes only one f-theta lens 6. The f-theta lens 6 is configured to convert the beam of light having been reflected and thus deflected by the polygon mirror 5 into a spot-like image to be focused on the target surface 51A to be scanned. The f-theta lens 6 is also configured to correct an optical face tangle error of each specular surface 5A of the polygon mirror 5. The f-theta lens 6 has f-theta characteristics such that the beam of light deflected at a constant angular velocity by the polygon mirror 5 is converted into a beam of light that scans the target surface 51A at a constant linear velocity. The f-theta lens 6 has a pair of opposite lens surfaces, namely, an incident-side (polygon mirror 5 side) lens surface L1 and an exit-side (surface 51A side) lens surface L2. The lens surfaces L1, L2 are aspheric in the main scanning direction, and are both toric surfaces. The curvature of each lens surface L1, L2 in a sub-scanning plane (cross section perpendicular to the main scanning direction) varies continuously and symmetrically from a position corresponding to an optical axis thereof (a first optical axis A1 of the lens surface L1, a second optical axis A2 of the lens surface L2) outward in the main scanning direction within an effective region.

In this embodiment, each lens surface L1, L2 can be expressed in any form without limitation, for example, by a bivariate polynomial with respect to the main scanning direction (y) and the sub-scanning direction (x), such as given by the following formula (6):

$$z_j = f(x, y) = \sum_m \sum_n (a_{m,n}) x^m y^n \qquad (6)$$

where $a_{m,n}$ is a coefficient.

The lens surface L1 has a shape symmetric with respect to the sub-scanning plane PL1 (see FIG. 3) containing the optical axis thereof (the first optical axis A1). The lens surface L2 also has a shape symmetric with respect to the sub-scanning plane PL2 (see FIG. 3) containing the optical axis thereof (the second optical axis A2). With this configuration, the lens surfaces L1, L2 can be fabricated easily. The lens surfaces L1, L2 may be fabricated for example by plastic injection molding or glass molding, using a mold having cavity surfaces of shapes reversely contoured to fit the shapes of the lens surfaces L1, L2, respectively. Since each lens surface L1, L2 has a shape symmetric with respect to the sub-scanning plane PL1, PL2 containing the optical axis thereof. A1, A2, a correction made in making the mold and an inspection made to the shape of the mold and the castings (molded products) can be carried out easily.

In the scanning optical apparatus 10 according to this embodiment, a sensing element 8 which produces a signal for synchronization at a start-of-scan position is disposed at a semiconductor laser 1 side with respect to the optical axes (the first optical axis A1, the second optical axis A2 of the lens surfaces L1, L2) of the f-theta lens 6. To be more specific, the position in which the sensing element 8 is located is on one of two sides out of a range of the deflected beam of light passing through the f-theta lens 6, which is the same side as that on which the semiconductor laser 1 is located. In this embodiment, the polygon mirror 5 is configured to spin counterclockwise in FIG. 2, so that the beam of light is deflected, starting from a lower position upward in FIG. 2. The start-of-scan position is located in a position (at one of two ends of a scan range in the main scanning direction) where the beam of light to be deflected enters the effective region on the surface 51A (i.e., an angular position indicated by $\theta_{sos}$ in FIG. 2), and a synchronization detection beam path $P_{bd}$ through which the beam of light reflected off the polygon mirror 5 (and having started to sweep up but not yet entering the effective region) travels from the polygon mirror 5 to the sensing element 8 is disposed outside the start-of-scan position. The sensing element 8 is disposed in a position such that the beam of light traveling along the synchronization detection beam path $P_{bd}$ is received by the sensing element 8.

The beam of light striking the specular surface 5A of the polygon mirror 5 in the form of a linear image extending in the main scanning direction is deflected at the polygon mirror 5, and converged by the f-theta lens 6 into a spot-like image to be focused on the surface 51A to be scanned.

To appropriately determine a layout of the optical system in which the beam of light is deflected by the polygon mirror 5, the arrangement of its constituent parts may be designed such that the beam of light emitted from the illumination optical system 14 and reflected off the polygon mirror 5 travels in all necessary directions covering the entire effective region from the start-of-scan position to the end-of-scan position (i.e., an angular position indicated by $\theta_{eos}$ in FIG. 2) inclusive, and including the direction of the synchronization detection beam path $P_{bd}$.

Figure 4:
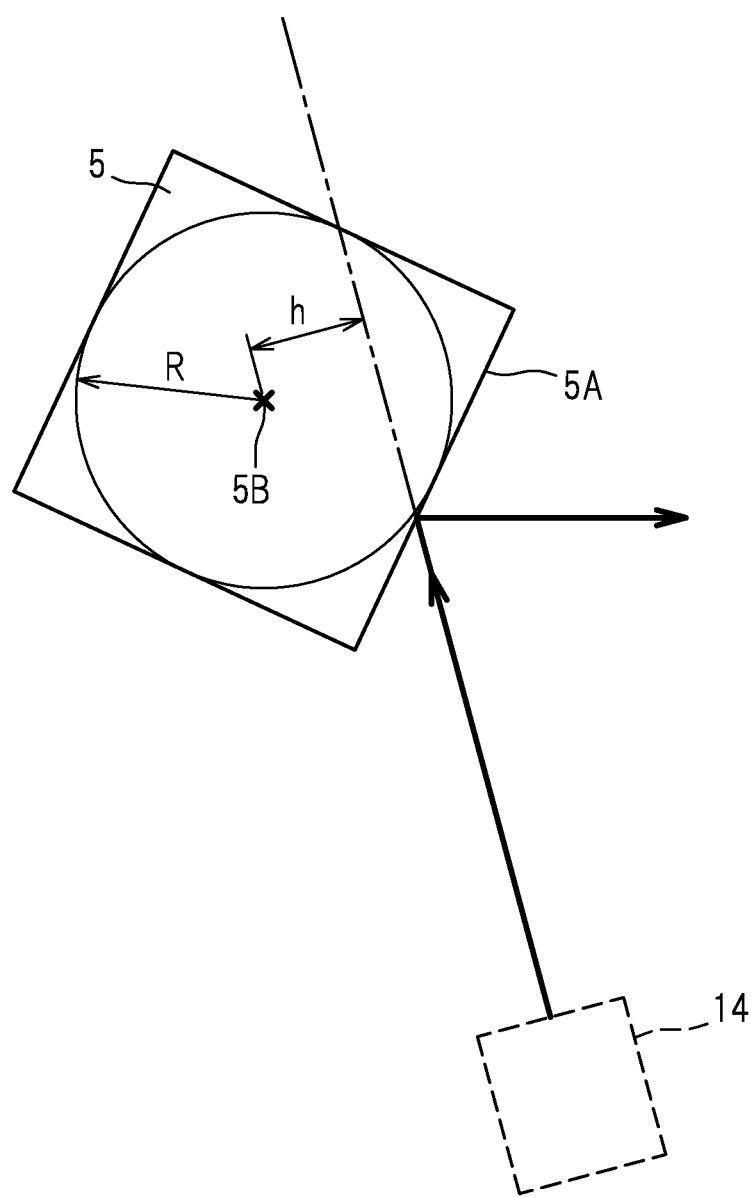
FIG. 4 is an enlarged view of a polygon mirror.

With the arrangement designed in accordance with the present embodiment, in which the synchronization detection beam path $P_{bd}$ is located in a position that is on the same side as that on which the semiconductor laser 1 is located with respect to the optical axes A1, A2 of the lens surfaces L1, L2 of the f-theta lens 6, if the point of incidence of the beam of light from the illumination optical system 14 on the specular surface 5A of the polygon mirror 5 were so close to the axis 5B of rotation of the polygon mirror 5, the beam of light could not be reflected toward the synchronization detection beam path $P_{bd}$ by the specular surface 5A oriented to a degree enough to reflect the beam of light toward the synchronization detection beam path $P_{bd}$, in that the beam of light would fail to strike the mirror 5A oriented as such. With this in view, a distance h between the axis 5B (center) of rotation of the polygon mirror 5 and a center of the beam of light incident on the polygon mirror 5 is set within an adequate range. In this embodiment, as shown in FIGS. 2 and 4, the distance h is set to fulfill the following conditions:

$$R(\sin((\alpha+\theta_{eos})/2) - \cos((\alpha+\theta_{eos})/2) \times \tan(\pi/N)) + (b_{eos}/2) \times \cos((\alpha+\theta_{eos})/2) < h, \text{ and}$$

$$h < R(\sin((\alpha+\theta_{bd})/2) + \cos((\alpha+\theta_{bd})/2) \times \tan(\pi/N)) - (b_{bd}/2) \times \cos(\alpha+\theta_{bd})/2) \quad (1)$$

where R indicates a radius of an inscribed circle of the polygon mirror 5, N indicates the number of specular surfaces of the polygon mirror 5, α indicates an angle [rad] formed by the beam of light incident on the polygon mirror 5 with a reference line DL extending in a direction of travel of the beam of light to be incident on the to-be-scanned surface 9A at right angles after being reflected off the polygon mirror 5, $\theta_{bd}$ indicates an angle [rad] formed by the beam of light traveling from the polygon mirror 5 along the synchronization detection beam path $P_{bd}$ with the reference line DL, $\theta_{eos}$ indicates an angle [rad] formed by the beam of light reflected off the polygon mirror 5 at an end-of-scan position with the reference line DL, and $b_{eos}$ and $b_{bd}$ indicate breadths of the beam of light in the main scanning direction on each of the specular surfaces 5A of the polygon mirror 5 at the end-of-scan position and at a position in which the beam of light reflected off the polygon mirror 5 travels along the synchronization detection beam path $P_{bd}$, respectively. When the distance h satisfies these conditions (1), symmetry of a sag in the position of reflection at the polygon mirror 5 with respect to the reference line DL is relatively low.

As seen in FIG. 2, a distance from the point of reflection at the specular surface 5A to the lens surface L1, and a distance from the lens surface L2 to the to-be-scanned surface 51A varies with an image height y on the surface 51A. The position at which a beam of light from the illumination optical system 14 strikes the specular surface 5A of the polygon mirror 5 varies with a direction of deflection. Therefore, a distortion (aberration) of an image such as a curvature of field occurs on the surface 51A.

In order to correct the aberration in a satisfactory manner, the scanning optical apparatus 10 in the present embodiment is configured such that the f-theta lens 6 satisfies all of the following conditions (2), (3), (4) and (5):

$$-0.59 < \beta 1 \leq 0 \quad (2)$$

$$-0.46 < \beta 2 \leq 0.2 \quad (3)$$

$$-0.6 \leq D1 < 0.43 \quad (4)$$

$$-0.17 \leq D2 \leq 0.16 \quad (5)$$

where β1 indicates an angle [deg] formed in a main scanning plane between the first optical axis A1 of the incident-side lens surface L1 and the reference line DL, β2 indicates an angle [deg] formed in the main scanning plane between the first optical axis A1 and the second optical axis A2 of the exit-side lens surface L2, D1 indicates an amount of shift [mm] in the main scanning plane, of a point O1 of intersection between the first optical axis A1 and the incident-side lens surface L1, from the reference line DL, and D2 indicates an amount of shift [mm] in the main scanning plane, of a point O2 of intersection between the second optical axis A2 and the exit-side lens surface L2, from the first optical axis A1. The angles β1 and β2 are expressed with the clockwise direction in FIG. 2 (the direction of rotation from the reference line DL toward the semiconductor laser 1) assumed to be positive, and the shift amounts D1 and D2 are expressed with the upward direction in FIG. 2 (the direction perpendicular to the reference line DL and opposite to the direction toward the semiconductor laser 1) assumed to be positive.

With this configuration, the angle β1 of the first optical axis with respect to the reference line DL in the main scanning plane (i.e., lens tilt amount) satisfies the condition expressed by the above inequality (2), the angle β2 formed in the main scanning plane between the first optical axis A1 and the second optical axis A2 (i.e., lens surface tilt amount) satisfies the condition expressed by the above inequality (3), the shift amount D1 that is the amount of shift in the main scanning plane, of the intersection point O1 that is the point of intersection between the first optical axis A1 and the incident-side lens surface L1, from the reference line DL (i.e., lens shift amount) satisfies the condition expressed by the above inequality (4), and the shift amount D2 that is the amount of shift in the main scanning plane, of the intersection point O2 that is the point of intersection between the second optical axis A2 and the exit-side lens surface L2, from the first optical axis A1 (i.e., lens surface shift amount) satisfies the condition expressed by the above inequality (5); therefore, even if a sag occurs at the polygon mirror 5 in an asymmetric manner deviated from the reference line DL, the incident-side and exit-side lens surfaces L1, L2 having characteristics deviated in the main scanning direction in the ranges of (2)-(5) serve to correct the deviation due to the sag at the polygon mirror 5, so that desirable optical characteristics can be achieved. Moreover, since the distance h between the center of rotation of the polygon mirror 5 and the center of the beam of light incident on the polygon mirror 5 satisfies the conditions (1) above, scanning can be performed throughout the entire scanning range in the main scanning direction without vignetting, despite the synchronization detection beam path $P_{bd}$ provided on the same side on which the semiconductor laser 1 is located (one of the two sides out of the range of the deflected beam of light passing through the f-theta lens 6) with respect to the f-theta lens 6.

Moreover, in the present embodiment, 0<R1 and 0<R2 are satisfied wherein R1 and R2 indicate paraxial radii of curvature in the main scanning plane of the lens surfaces L1, L2, respectively. In other words, the lens surface L1 has a convex shape bulging toward the polygon mirror 5 in the main scanning plane with the intersection point O1 being in a position closer to to the polygon mirror 5, and the lens surface L2 has a concave shape recessed toward the polygon mirror 5 in the main scanning plane with the intersection point O2 being in a position closer to the polygon mirror 5.

With this configuration, thicknesses of portions of the f-theta lens 6 adjacent to the both ends thereof in the main scanning direction (i.e., distance between the lens surface L1 and the lens surface L2) can be designed to be thick so that the f-theta lens 6 can be manufactured with increased ease.

Furthermore, as the f-theta lens 6 fulfills the aforementioned conditions, a distance C1 the beam of light travels on the reference line DL from the specular surface 5A of the polygon mirror 5 to the exit-side lens surface L2 of the f-theta lens 6 can be made shorter, and thus the scanning optical apparatus 10 can be designed to be compact in size. This distance C1 may be adjusted appropriately, and the examples which will be described below have shown that C1/C2=0.21 is feasible where C2 is a maximum scanning range (the width in which an image can be formed) on the to-be-scanned surface 51A. In order to make the scanning optical apparatus 10 advantageously compact in size, C1/C2 may preferably be smaller than 0.25.

EXAMPLES

The following examples describe the ranges of the shift amounts D1, D2 and the tilt amounts β1, β2 which serve to achieve good image qualities with reduced curvatures of field.

In each example, the two opposite lens surfaces L1, L2 of the f-theta lens 6 were both configured to be toric. The lens surfaces L1, L2 of the f-theta lens 6 provided in the scanning optical apparatus 10 in the examples have the shapes in the main scanning direction and the sub-scanning direction as represented by the following formulae.

When the intersection point between each lens surface L1, L2 of the f-theta lens 6 and the optical axis A1, A2 is taken as an origin, the optical axis direction is taken as a z-axis, and an axis orthogonal to the optical axis in the main scanning plane is taken as a y-axis, the meridional direction corresponding to the main scanning direction is given by the following formula:

$$z = \frac{c_y y^2}{1+\sqrt{1-(1+cc)c_y^2 y^2}} + A_4 y^4 + A_6 y^6 + A_8 y^8 + A_{10} y^{10} + A_{12} y^{12} \quad (7)$$

where $c_y$, $cc$, $A_4$, ..., $A_{12}$ are constants.

The sagittal direction corresponding to the sub-scanning direction is given by the following formula:

$$s = \frac{x^2/r'}{1+\sqrt{1-(x/r')^2}} \quad (8)$$

Herein, the radius r' of curvature in the sub-scanning direction at a point on the y-coordinate of each lens surface L1, L2 is given, with the reciprocal cx of the radius of curvature in the sub-scanning direction on the corresponding optical axis A1, A2, as follows:

$$r' = 1/cx(1+B_2 y^2 + B_4 y^4 + B_6 y^6 + B_8 y^8 + B_{10} y^{10} + B_{12} y^{12}) \quad (9)$$

where $cx$, $B_2$, ..., $B_{12}$ are constants.

The optical system including the lenses with the lens surfaces L1, L2 of which the shapes are represented by the above formulae (7)-(9) were prepared for Example 1 with specific properties of the optics and specific constants of the lenses as shown in FIG. 5.

In Examples 2-4, 6-9 (see FIG. 8), the values of the lens shift amount D1, the lens tilt amount β1, the shift amount D2 of the lens surface L2, and the tilt amount β2 of the lens surface L2 were set by first determining whether or not each value has the fixed value of 0 (zero), and then selecting an adequate combination of these values which is expected to produce good results in the characteristics such as curvatures of field in the main and sub-scanning directions, f-theta characteristics, and linearity, using optical design software such as CODE V provided by Optical Research Associates (ORA) and ZEMAX provided by ZEMAX Development Corporation. In Example 1, all the values of the lens shift amount D1, the lens tilt amount β1, the shift amount D2 of the lens surface L2, and the tilt amount β2 of the lens surface L2 were freely selected without constraints (i.e., no value fixed to zero or other) using the above software.

In Example 5, the tilt amount β2 of the lens surface L2 is fixed to −0.081 and the other values were determined using the above software. In Example 10, the tilt amount β1 of the lens surface L1 is fixed to −0.588, the tilt amount β2 of the lens surface L2 is fixed to 0.200 and the other values were determined using the above software.

In Comparative Example 1, the shift amount D1 of the lens surface L1 is fixed to −0.700, the tilt amount β1 of the lens surface L1 is fixed to 0, the tilt amount β2 of the lens surface L2 is fixed to −0.515, and the other values were determined using the above software. In Comparative Example 2, the tilt amount β1 of the lens surface L1 is fixed to −0.645, the shift amount D2 of the lens surface L2 is fixed to −0.201, the tilt amount β2 of the lens surface L2 is fixed to 0.300 and the other values were determined using the above software.

In all of the Examples and Comparative Examples, the radius R of the inscribed circle of the polygon mirror 5 and the number N of specular surfaces of the polygon mirror 5 were set at the same values: R=7.00 mm and N=4. The other values were: h=5.6 mm, $\theta_{bd}$=−60.96 deg, and $\theta_{eos}$=47.75 deg. With these examples designed as described above, $b_{bd}$=1.870 mm and $b_{eos}$=5.006 mm, and thus the formulae represented in (1) were calculated as follows:

$$R(\sin((\alpha+\theta_{eos})/2)-\cos((\alpha+\theta_{eos})/2)\times\tan(\pi/N))+(b_{eos}/2)\times\cos((\alpha+\theta_{eos})/2)<h, \text{ and}$$

$$R(\sin((\alpha+\theta_{bd})/2)+\cos((\alpha+\theta_{bd})/2)\times\tan(\pi/N))-(b_{bd}/2)\times\cos((\alpha+\theta_{bd})/2) \quad (1)$$

which showed that the conditions (1) were satisfied.

Figure 7:
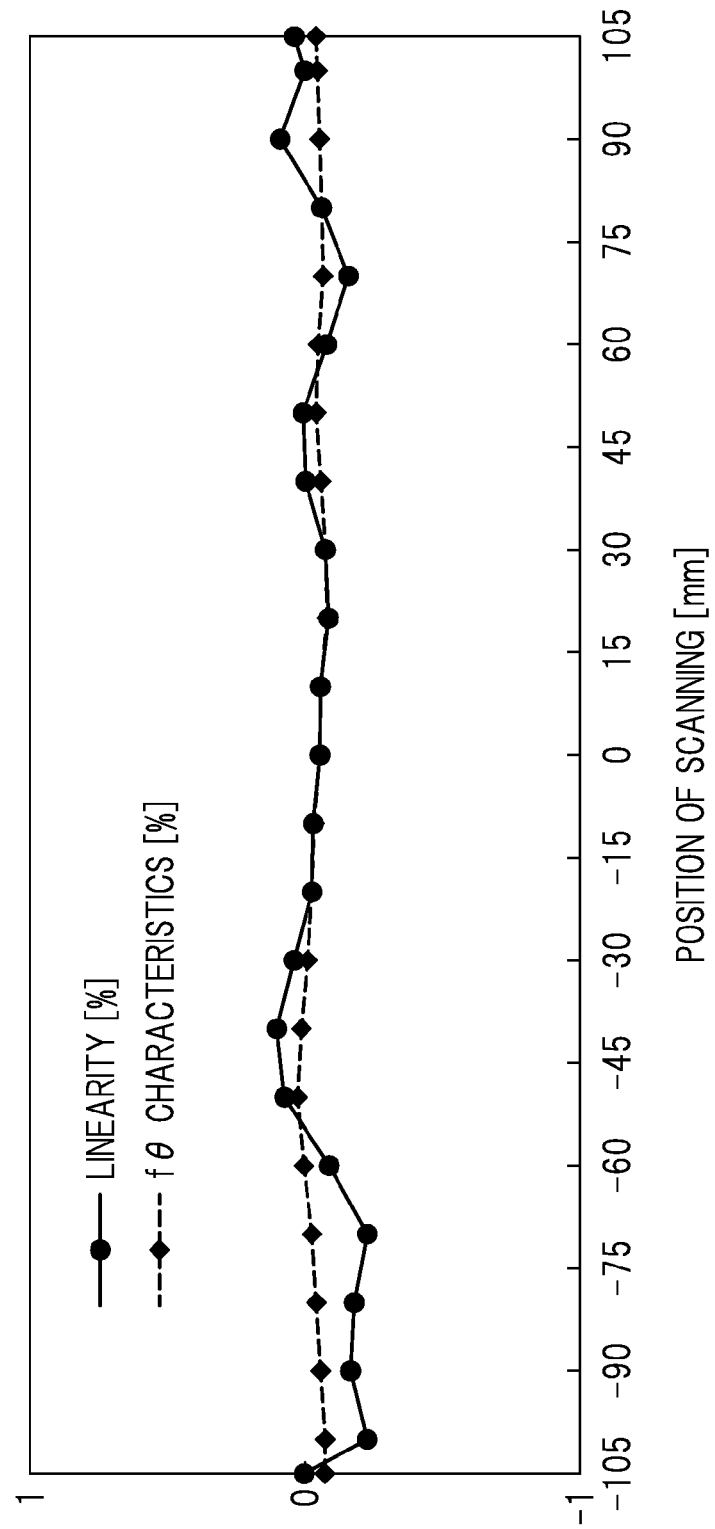
FIG. 7 is a graph showing f-theta and linearity characteristics, obtained from Example 1.

The results of the optical design described above were graphically illustrated in FIGS. 6 and 7 in which the curvatures of field, f-theta characteristics and linearity of the optical system as obtained in Example 1 were shown. Peak-to-valley values of these characteristics were tabulated with the values of the lens shift amount D1, the lens tilt amount β1, the shift amount D2 of the lens surface L2, and the tilt amount β2 of the lens surface L2, and shown in FIG. 8.

As shown in FIG. 8, in the scanning optical apparatuses 10 implemented in Examples 1-10, regardless of their propensity toward such a "sag" phenomenon as to be relatively asymmetric with respect to the reference line DL because of their h-value satisfying the conditions represented by the formula (I) described above, the optical properties such as curvatures of field derived from such an asymmetric sag generating propensity, as well as f-theta characteristic and linearity were compensated by setting D1, D2, β1 and β2 appropriately, with the result that the PV values of the curvatures of field in the main scanning direction and in the sub-scanning direction were within the range of 3 mm or below. Prior experiments for optimizing the optical properties has shown that the PV values of the curvatures of field in the main scanning direction and in the sub-scanning direction would be far more than 3 mm even if the sag were rendered nearly symmetric with respect to the reference deflected chief ray. It has been shown that the optical properties achieved in Examples are superior to those of the prior-art approach.

When D1 and β2 do not satisfy the conditions represented by the inequalities (4) and (3), respectively, as in Comparative Example 1, any attempt of optimization using the above software would result in more than 3 mm PV values of the curvatures of field in the main scanning direction, and favorable optical properties could not be achieved. Similarly, when β1, D2 and β2 do not satisfy the conditions represented by the inequalities (2), (3) and (5), respectively, as in Comparative Example 2, any attempt of optimization using the above software would also result in more than 3 mm PV values of the curvatures of field in the main scanning direction.

Although the illustrative embodiment of the present invention has been described above, the present invention is not limited to the above-described embodiments. Various modifications and changes may be made to the specific structures and arrangement without departing from the scope of the present invention. For example, the number of specular surfaces of the polygon mirror may not be limited to four as illustrated, but may be six.

What is claimed is:

1. A scanning optical apparatus comprising:
    a light source;
    a first optical element configured to convert light emitted from the light source into a beam of light;
    a second optical element configured to convert the beam of light having passed through the first optical element into a linear image extending in a main scanning direction;
    a polygon mirror configured to deflect the beam of light having passed through the second optical element in the main scanning direction;
    a third optical element configured to convert the beam of light having been deflected by the polygon mirror into a spot-like image to be focused on a to-be-scanned surface, the third optical element being a single lens having a pair of opposite incident-side and exit-side lens surfaces having first and second optical axes, respectively, each of the pair of opposite lens surfaces being aspheric in a main scanning direction, and having a curvature in a sub-scanning direction varying continuously and symmetrically from a position corresponding to the optical axis thereof outward in a main scanning direction, each of the pair of lens surfaces having a shape symmetric in the main scanning direction with respect to a sub-scanning plane containing the optical axis thereof; and
    a synchronization detection beam path configured such that a beam of light having passed therethrough is directed to a sensing element producing a signal for synchronization at a start-of-scan position, the synchronization detection beam path being located on one of two sides out of a range of the deflected beam of light passing through the third optical element, wherein the one of two sides is the same side as that on which the light source is located,
    wherein a distance h between a center of rotation of the polygon mirror and a center of the beam of light incident on the polygon mirror fulfills the following conditions:

$$R(\sin((\alpha+\theta_{eos})/2)-\cos((\alpha+\theta_{eos})/2)\times\tan(\pi/N))+(b_{eos}/2)\times\cos((\alpha+\theta_{eos})/2)<h, \text{ and}$$

$$h<R(\sin((\alpha+\theta_{bd})/2)+\cos((\alpha+\theta_{bd})/2)\times\tan(\pi/N))-(b_{bd}/2)\times\cos((\alpha+\theta_{bd})/2) \quad (1)$$

where R indicates a radius of an inscribed circle of the polygon mirror, N indicates the number of specular surfaces of the polygon mirror, α indicates an angle [rad] formed by the beam of light incident on the polygon mirror with a reference line extending in a direction of travel of the beam of light to be incident on the to-be-scanned surface at right angles after being reflected off the polygon mirror, $\theta_{bd}$ indicates an angle [rad] formed by the beam of light traveling from the polygon mirror along the synchronization detection beam path with the reference line, $\theta_{eos}$ indicates an angle [rad] formed by the beam of light reflected off the polygon mirror at an end-of-scan position with the reference line, and $b_{eos}$ and $b_{bd}$ indicate breadths of the beam of light in the main scanning direction on each of the specular surfaces of the polygon mirror at the end-of-scan position and at a position in which the beam of light reflected off the polygon mirror travels along the synchronization detection beam path, respectively; and
    wherein the third optical element fulfils all of the following conditions:

$$-0.59<\beta 1\leq 0,$$

$$-0.46<\beta 2\leq 0.2,$$

$$-0.6\leq D1<0.43, \text{ and}$$

$$-0.17\leq D2\leq 0.16$$

where β1 indicates an angle [deg] formed in a main scanning plane between the first optical axis and the reference line, β2 indicates an angle [deg] formed in the main scanning plane between the first optical axis and the second optical axis, D1 indicates an amount of shift [mm] in the main scanning plane, of a point of intersection between the first optical axis and the incident-side lens surface, from the reference line, and D2 indicates an amount of shift [mm] in the main scanning plane, of a point of intersection between the second optical axis and the exit-side lens surface, from the first optical axis.

2. The scanning optical apparatus according to claim 1, wherein the third optical element satisfies the following conditions:

$$0<R1 \text{ and } 0<R2$$

where R1 and R2 indicate paraxial radii of curvature in the main scanning plane of the incident-side and exit-side lens surfaces, respectively.

3. The scanning optical apparatus according to claim 1, wherein the following condition is satisfied:

$$C1/C2<0.25$$

wherein C1 is a distance the beam of light travels on the reference line from a specular surface of the polygon mirror to the exit-side lens surface of the third optical element, and C2 is a maximum scanning range on the to-be-scanned surface.

4. The scanning optical apparatus according to claim 2, wherein the following condition is satisfied:

$$C1/C2<0.25$$

wherein C1 is a distance the beam of light travels on the reference line from a specular surface of the polygon mirror to the exit-side lens surface of the third optical element, and C2 is a maximum scanning range on the to-be-scanned surface.

5. An image forming apparatus comprising the scanning optical apparatus according to claim 1.

* * * * *